United States Patent
Yang

(10) Patent No.: US 10,782,142 B2
(45) Date of Patent: Sep. 22, 2020

(54) DYNAMIC VEHICLE NAVIGATION SYSTEM WITH ROADWAY JUNCTION IMPACT

(71) Applicant: TOYOTA JIDOSHA KABUSHIKI KAISHA, Toyota-shi, Aichi-ken (JP)

(72) Inventor: Hao Yang, Mountain View, CA (US)

(73) Assignee: Toyota Jidosha Kabushiki Kaisha, Toyota-Shi (JP)

(*) Notice: Subject to any disclaimer, the term of this patent is extended or adjusted under 35 U.S.C. 154(b) by 168 days.

(21) Appl. No.: 15/950,057

(22) Filed: Apr. 10, 2018

(65) Prior Publication Data
US 2019/0310096 A1    Oct. 10, 2019

(51) Int. Cl.
*G01C 21/34* (2006.01)
*G01C 21/36* (2006.01)

(52) U.S. Cl.
CPC ..... *G01C 21/3492* (2013.01); *G01C 21/3484* (2013.01); *G01C 21/3691* (2013.01)

(58) Field of Classification Search
CPC ............ G01C 21/3492; G01C 21/3691; G01C 21/3484
See application file for complete search history.

(56) References Cited

U.S. PATENT DOCUMENTS

| | | | |
|---|---|---|---|
| 6,034,626 | A | 3/2000 | Maekawa et al. |
| 2010/0010735 | A1 | 1/2010 | Inoguchi et al. |
| 2010/0049428 | A1* | 2/2010 | Murata ............... G09B 29/007 701/118 |
| 2014/0278052 | A1 | 9/2014 | Slavin et al. |

FOREIGN PATENT DOCUMENTS

| | | |
|---|---|---|
| JP | 200099889 A2 | 4/2000 |
| JP | 2003021524 A | 1/2003 |
| JP | 200571298 | 3/2005 |
| JP | 200647246 A | 2/2006 |

OTHER PUBLICATIONS

Volker, "Route Planning in Road Networks with Turn Costs," study thesis, University of Karlsruhe, Institute for theoretical computer science, 2008 (30 pages).

(Continued)

*Primary Examiner* — Aaron L Troost
*Assistant Examiner* — Chase L Cooley
(74) *Attorney, Agent, or Firm* — Patent Law Works, LLP

(57) ABSTRACT

The disclosure includes a system and method for dynamic vehicle navigation using roadway junction impact. The system includes one or more processors configured to identify a client device location and a destination location, and to determine roadway segments and roadway junctions based on the client device location, destination location, and map data. The system may calculate a travel time for each roadway segment, an impact of traffic on a local roadway junction travel time, an impact of traffic on a remote roadway junction travel time, determine routes between the client device location and the destination location using the determined travel times, and calculate a total travel time for each route based on the travel times. In some instances, the system may determine and provide route guidance for a selected route.

20 Claims, 8 Drawing Sheets

(56) References Cited

OTHER PUBLICATIONS

Zhu et al., "A Simplified Real-time Road Network Model Considering Intersection Delay and its Application on Vehicle Navigation," Applied Mechanics and Materials, vols. 58-60, 2011 (8 pages).
Geisberger et al., "Efficient Routing in Road Networks with Turn Costs," International Symposium on Experimental Algorithms, Karlsruhe Institute of Technology, 2011 (12 pages).
First Office Action of Japanese Application No. 2019-068254, dated Feb. 25, 2020 (4 pages).

\* cited by examiner

DYNAMIC VEHICLE NAVIGATION SYSTEM WITH ROADWAY JUNCTION IMPACT

BACKGROUND

The present disclosure relates to a navigation system for estimating journey route travel times. In particular, the specification relates to a navigation system that increases accuracy of estimated travel times using the impact of roadway junctions on travel time.

Users are increasingly relying on navigational systems on computing devices to provide useful information during travelling. However, existing systems generally only take into consideration averages of routes or roads and do not take into consideration the impact of delays at intersections, freeway on-ramps, and other roadway junctions.

In transportation networks, due to the geometries of roads and various origin-destination pairs, vehicles traveling on the same roadway may have different movements to connect to other roadways. Such movements result in differing delays at roadway junctions, such as intersections, which can affect the results of route calculation and navigation.

Some existing navigation systems search for the shortest path for an individual vehicle based on total distance or average roadway travel times. Some navigation systems take into consideration restrictions on turns and the time required to make turns based on distance and speed. However, vehicle queues at roadway junctions result in unexpected delays for individual vehicles and high travel time uncertainties and are not addressed by these existing system.

One patent publication describing vehicle navigation is U.S. Pat. No. 6,034,626 ('626). '626 describes a navigation system that searches for the optimal route for each individual vehicle from a preferred route and a non-preferred route based on user preferences. While turn times may be considered in '626 they are not well estimated, because '626 considers intersection delays in constant terms based on road speed limits and turn curvatures, regardless of traffic conditions, signals, and other dynamic factors. However, vehicle queues, traffic signals, etc., can have a significant impact accuracy of estimated travel time. Further, '626 does not consider connections between, for instance, freeways and arterial roads or through intersections, which prevents the system from being generalized for urban roadway networks.

Other navigation systems are described in Volker, L., "Route Planning in Road Networks with Turn Costs," *Tech Report, University Karlsruhe*, 2008 (Volker), and Geisberger, R. and Vetter, C., "Efficient Routing in Road Networks with Turn Costs," *International Symposium on Experimental Algorithms*, vol. 11, pp. 100-111, 2011 (Geisberger). Volker and Geisberger consider turn time in route choice algorithms to search for shortest paths for individual vehicle based on edge-based graphs and node contraction methods, respectively. In both studies, the turn costs are determined by turning speed and turning distance at intersections. These studies consider the cost of traffic on speed through turns, but do not take into consideration traffic impact, such as queues and waiting times before roadway junctions. Further, Voker and Geisberger only estimate cost of turning movements through certain angles, and not for other junction types, for instance, where a vehicle may travel in a substantially straight line.

Another navigation system is described in Zhu, Z., Liu, W., Liu, L., Cui, M., and Li, J., "A Simplified Real-Time Road Network Model Considering Intersection Delay and Its Application on Vehicle Navigation," *Applied Mechanics and Materials*, vol. 58, pp. 1959-1965, 2011 (Zhu). Zhu considers a simplified real-time road network model to plan a dynamic optimal path for a vehicle according to real-time traffic data received periodically from the city's traffic center. Zhu uses real-time delay in limited intersection types; however, vehicle queues at intersections change quickly, so calculating the impact due to the queues for an entire route is often inaccurate for remote intersections, because the queues may change before the vehicle arrives at those intersections. Accordingly, simply using real-time delays is not sufficient for optimal route estimation, especially for vehicles with longer trips, and initial computation of real-time delay consumes substantial bandwidth and computing resources, which is compounded each time the real-time delay is refreshed.

It is desirable to address the limitations of the foregoing approaches.

SUMMARY

The system overcomes the deficiencies of the prior art with technology that provides vehicle navigation using roadway junction impact. In one implementation, the system includes software, firmware, hardware, or a combination of them installed on the system that in operation causes or cause the system to perform operations, for instance, using a processor, non-transitory storage device, and instructions executed by the processor. According to some implementations, the operations include identifying, by a processor, a first location of a client device and a destination location; determining, by the processor, a plurality of roadway segments and a plurality of roadway junctions based on the first location of the client device, the destination location, and map data, the plurality of roadway junctions including one or more local roadway junctions below a threshold and one or more remote roadway junctions above the threshold; calculating, by the processor, a roadway segment travel time for each roadway segment of the plurality of roadway segments; calculating, by the processor, a local impact of traffic on a local roadway junction travel time for each of the one or more local roadway junctions and a remote impact of traffic on a remote roadway junction travel time for each of the one or more remote roadway junctions; determining, by the processor, a set of routes between the first location of the client device and the destination location using the map data, the roadway segment travel times for the plurality of roadway segments, the local roadway junction travel times of the one or more local roadway junctions, and the remote roadway junction travel times of the one or more remote roadway junctions; calculating, by the processor, a total travel time for each route in the set of routes based on the roadway segment travel times, the local roadway junction travel times, and the remote roadway junction travel times; determining, by the processor, route guidance data for a particular route selected from the set of routes; and providing, by the processor, route guidance for the particular route to the client device based on the route guidance data.

Implementations may include one or more of the following features: the computer-implemented method where calculating the local impact of traffic on the local roadway junction travel time includes receiving, by the processor, local roadway junction information of a local roadway junction including a real-time delay at the local roadway junction, the local roadway junction including one or more of a traffic signal, intersection, freeway onramp, and freeway off-ramp, and calculating, by the processor, the local impact of traffic based on the real-time delay. The computer-implemented method where calculating the remote impact of traffic on the remote roadway junction travel time includes receiving, by the processor, remote roadway junction information of a remote roadway junction including a historical time delay at the remote roadway junction, the remote roadway junction including one or more of a traffic signal, intersection, freeway onramp, and freeway off-ramp, and calculating, by the processor, the remote impact of traffic based on the historical time delay. The computer-implemented method where the plurality of roadway segments include a local roadway segment within the threshold and a remote roadway segment exceeding the threshold. The computer-implemented method where determining the roadway segment travel time for each roadway segment of the plurality of roadway segments includes identifying, by the processor, the local roadway segment and the remote roadway segment based on the threshold, the roadway segment travel time including one or more of a local roadway segment travel time and a remote roadway segment travel time, the local roadway segment travel time being based on a real-time travel time through the local roadway segment, and the remote roadway segment travel time being based on a historical travel time through the remote roadway segment. The computer-implemented method where calculating the total travel time includes determining average roadway segment travel times for a roadway segment in each route in the set of routes based on the local roadway segment travel time and the remote roadway segment travel time of roadway segments in the route. The computer-implemented method where the plurality of roadway junctions include at least a freeway onramp. The computer-implemented method where providing the route guidance for the particular route to the client device based on the route guidance data includes recalculating travel times for the particular route based on a second location of the client device during transit of the particular route by the client device. The computer-implemented method including calibrating, by the processor, the threshold using a deviation among local roadway junction travel times, remote roadway junction travel times, and measured travel times. The computer-implemented method where determining the route guidance data for the particular route includes selecting, by the processor, the particular route from the set of routes based on the total travel time and a stored user preference for particular route attributes.

This document discloses innovative technology for addressing the problems in the Background. The technology can allow increased accuracy by considering delays at roadway junctions separately from roadway segments. Some implementations may also improve computer performance by reducing the quantity of information to be retrieved and processed when a route is calculated or recalculated. These and other benefits are described in further detail below.

BRIEF DESCRIPTION OF THE DRAWINGS

The invention is illustrated by way of example, and not by way of limitation in the figures of the accompanying drawings in which like reference numerals are used to refer to similar elements.

DESCRIPTION

Figure 1:
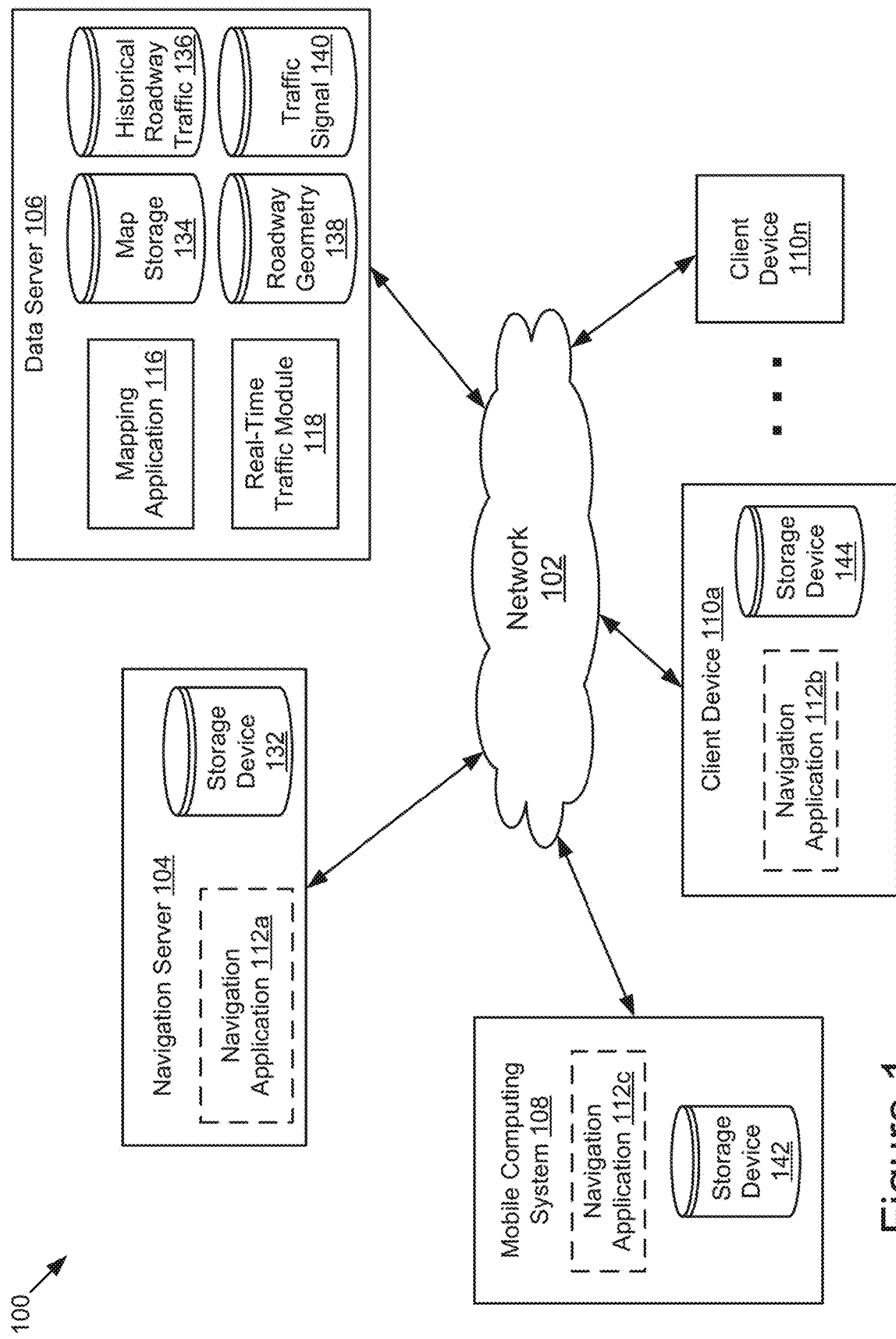
FIG. 1 is a block diagram illustrating an example dynamic vehicle navigation system with roadway junction impact.

Technology for generating navigation routes using roadway junction impact are described below. The technology includes a dynamic vehicle navigation system that searches for the optimal routes of individual vehicles with minimum travel time considering roadway junction impacts before or during trips. The system updates the impacts of roadway junctions, such as intersections, freeway on-ramps, and freeway exiting lanes to off-ramps, in real-time in order to compute the shortest paths (e.g., in travel time) to reduce roadway junction delays and travel time uncertainties for vehicles, as well as to improve the performance of entire urban roadway networks. In some implementations, roadway segments, along with local and remote roadway junctions connecting the roadway segments, may be determined along with their travel times, for instance, based on historical and real-time traffic conditions. The technology described herein decrease travel time, increase accuracy in predicting travel time and therefor certainty in estimated time of arrival and selected routes, decrease overall bandwidth usage, and reduce consumed computational resources.

A roadway segment may be defined as a section or length of road with one, two, or several roadway junctions connecting the roadway segment to one or more other roadway segments. In some instances, a roadway segment may be a segment of road between two intersections, a length of freeway or highway with one or more connecting roadway junctions, or another road.

A roadway junction may be defined as a connection between two or more roadway segments. In some implementations, roadway junctions may be a virtual link with zero distance to connect roadway segments, although in other implementations, the roadway junction may be defined as including a physical size. A vehicle (or other mobile computing system 108 or client device 110) may exit a current roadway segment, stay at a roadway junction for a certain time, and then enter a next roadway segment to continue through route guidance. A delay, impact, penalty, or cost of passing through the roadway junction may be defined as the time spent at the roadway junction or the additional time spent at a roadway junction (e.g., in addition to a base roadway junction travel time defined by length, geometry, and speed of a turn, depending on the implementation). For example, an impact or cost may be estimated as the sum of a waiting time of a queue and a delay to pass through a roadway junctions (e.g., due to a delay or a time spent to make a turn).

Example implementations of roadway segments and roadway junctions are illustrated and described in further detail in reference to FIGS. 5A and 5B below.

In some implementations, the impact or delay of the roadway junction may include the extra time that one vehicle spends to enter a next roadway segment compared with other vehicles on the same roadway segment entering different target roadway segments. Using the impact of traffic on local roadway junction travel time allows the system 100 to make a more accurate assessment of the total travel time of a given route.

In some implementations, a roadway junction may include road features, such as intersections, freeway on-ramps, freeway meters, freeway off-ramps, exit lanes on a freeway, and similar road features. In some implementations, a roadway junction may be differentiated based on lane or based on the roadway segments it connects, for example, the system 100 may perceive an intersection as including a first roadway junction for a left turn, a second roadway junction for traveling through the intersection, and a third roadway junction for a right turn. Accordingly, vehicles, traffic, and routes going from one roadway segment to various other roadway segments can be differentiated to further increase accuracy.

With reference to the figures, reference numbers may be used to refer to components found in any of the figures, regardless whether those reference numbers are shown in the figure being described. Further, where a reference number includes a letter referring to one of multiple similar components (e.g., component 000a, 000b, and 000n), the reference number may be used without the letter to refer to one or all of the similar components.

FIG. 1 is a block diagram illustrating one example implementation of a dynamic vehicle navigation system 100 using a roadway junction impact. The illustrated system 100 includes a navigation server 104, a data server 106, a mobile computing system 108, and a client device 110 communicatively coupled via a network 102, although it should be noted that additional or fewer components may be used.

The navigation application 112 may be operable on one or more of the components 104, 106, 108, and 110 of the system 100. For example, an instance of the navigation application 112a may be operable on the navigation server 104, 112b on the client device 110a . . . 110n, 112c on the mobile computing system 108, or in some instances, the navigation application 112 may be distributed among two or more components of the system 100.

The navigation application 112 may include logic execute to determining routes and performing actions described herein. In some implementations, the navigation application 112 retrieves position data associated with a mobile computing system 108, client device 110, or a user. The navigation application 112 may retrieve information from the navigation server 104 and/or the data server 106 (e.g., the mapping application 116, real-time traffic module 118, etc.) to perform its operations, as described herein. For example, the position data describes a geographical position a map. Example components of the navigation application 112 are described in further detail with reference to FIG. 2.

The navigation application 112 integrates roadway junction penalties or impacts with roadway segment travel time to develop a dynamic navigation system for devices searching for paths with minimal delays and lower travel time uncertainties. For instance, the technology may set appropriate weights for delays at roadway junctions instead of merely applying average road travel time. For example, the system 100 may consider the waiting time or queue of vehicles or mobile computing systems 108 before a turn, traffic signal, on-ramp, or other roadway junction.

In some implementations, the system 100, or components thereof (e.g., the navigation application 112), may treat roadway junctions as discrete navigation elements separate from roadway segments. Compared with previously existing navigation systems, such as those described in the Background, the system 100 provides numerous benefits, for example, by estimating the time spent or delays for vehicles to enter and/or exit a roadway junction due to vehicle queues, traffic signals, high demands at restricted road segments (e.g., freeway on and off-ramps), and integrates the delays in the estimation of vehicle routes. By taking these factors into consideration, the system 100 increases prediction accuracy, especially for navigation through routes that have multiple intersections, signals, on-ramps, or other roadway junctions.

In some implementations, the technology described herein differentiates between local and remote roadway junctions and/or segments in order to further increase the accuracy of the travel-time estimation while reducing computational complexity, consumed bandwidth, quantity of data calls, and consumed computational resources. Compared with previous lane-level navigation systems, the technology consumes fewer processing cycles to estimate and predict traffic conditions, thereby allowing more efficient real-time update of vehicle routes. For example, the technology described herein may use real-time traffic within a defined threshold distance or time and historical traffic for roadway segments or roadway junctions exceeding the threshold. Accordingly, because real-time traffic may change quickly, the nearby (e.g., local) delays may be calculated using real-time traffic, while the delays for further away segments or junctions can use historical data and therefore, in some instances, a longer refresh interval, thereby reducing bandwidth and processing consumption. For instance, historical traffic data can be cached and updated less frequently than real-time traffic data.

Some implementations of the navigation application 112 dynamically re-route vehicles in networks to avoid congested regions and to assist the network to better utilize road segments. For example, the system 100 may recalculate route and estimated travel time/estimated time of arrival during route guidance to adapt to changing traffic conditions. During these recalculations, the computational benefits described above are further compounded. Additionally, because the accuracy of real-time traffic data may exceed the accuracy of historical traffic data, the when the route is recalculated, those roadway segments or roadway junctions within the threshold (e.g., that may not have originally been within the threshold) range from the mobile computing system 108 or client device 110 may be recalculated using the real-time data thereby increasing accuracy.

The network 102 may be a conventional type, wired and/or wireless, and may have numerous different configurations including a star configuration, token ring configuration, or other configurations. For example, the network 102 may include one or more local area networks (LAN), wide area networks (WAN) (e.g., the Internet), personal area networks (PAN), public networks, private networks, virtual networks, virtual private networks, peer-to-peer networks, near field networks (e.g., Bluetooth®, NFC, etc.), vehicular networks, and/or other interconnected data paths across which multiple devices may communicate.

The network 102 may also be coupled to or include portions of a telecommunications network for sending data in a variety of different communication protocols. Example protocols include, but are not limited to, transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other suitable protocols. In some embodiments, the network 102 is a wireless network using a connection such as DSRC (Dedicated Short Range Communication), WAVE, 802.11p, a 3G, 4G, 5G+ network, WiFi™, satellite networks, vehicle-to-vehicle (V2V) networks, vehicle-to-infrastructure/infrastructure-to-vehicle (V2I/I2V) networks, or any other wireless networks. Although FIG. 1 illustrates one network 102 coupled to the navigation server 104, the client device(s) 110, the mobile computing system(s) 108, and the data server 106, in practice one or more networks 102 can be connected to these and other entities.

The navigation server 104 can be a hardware or virtual server that includes a processor, a memory and network communication capabilities. In some implementations, the navigation server 104 sends and receives data to and from one or more of the data server 106, the client device 110a . . . 110n, and the mobile computing system 108. The navigation server 104 also includes a storage device 132, which may include registration data for users, routes (e.g. new routes and historical routes), intersections, maps, etc.

In some implementations, the client device 110a . . . 110n sends and receives data to and from one or more of the navigation server 104, the data server 106, or the mobile computing system 108. The client device 110 is a computing device that includes a memory and a processor, for example a laptop computer, a desktop computer, a tablet computer, a mobile telephone, a personal digital assistant, smartwatch, or other computing device. In some implementations, the client device 110a includes a browser for accessing online services (e.g., a navigation server 104) and a storage device 144 for storing registration data for users, routes, intersections, maps, location information, etc. In some implementations, as described in reference to FIG. 2, the client device 110 may include position locating capabilities, such as a Global Positioning System (GPS) receiver, Wi-Fi radio, cellular radio, or other device for determining its location.

In some instances, a navigation application 112 acts in part as a thin-client application that may be stored on the client device 110 and in part as components that may be stored on the navigation server 104. For example, the navigation server 104 may store the user data in the storage device 132 and estimate a route for the user.

In some implementations, the mobile computing system 108 sends and receives data to and from one or more of the navigation server 104, the data server 106, and the client device 110. The mobile computing system 108 is any computing device that includes a memory and a processor. In one implementation, the mobile computing system 108 is may comprise any vehicle or any other mobile system with non-transitory computer electronics (e.g., a processor, a memory or any combination of non-transitory computer electronics). Examples include a car, plane, boat, truck, bionic implant, robot, personal transport device, commercial transport device, etc. In some implementations, the mobile computing system 108 includes a storage device 142 for storing registration data for users, routes, intersections, maps, etc. In some implementations, as described in reference to FIG. 2, the mobile computing system 108 may include position capabilities, such as a GPS receiver, Wi-Fi radio, cellular radio, or other device for determining its location.

The data server 106 may include a mapping application 116, a real-time traffic module 118, map storage 127, historical roadway traffic data 136, roadway geometry data 138, and traffic signal data 140, for example. In the illustrated implementation, the data server 106 is connected to the network 102 via which it may communicate with other components of the system 100. In some implementations, the mapping application 116 receives a request for a map from the navigation application 112. For example, the navigation application 112 requests a map describing one or more freeways or portions of freeways between multiple intersections. In some implementations, the mapping application 116 fetches map data describing a map from the map storage 127 and sends the map data to the navigation application 112. In some other implementations, the mapping application 116 generates additional or different information relating to navigation. For example, the information relating to navigation may include, but are not limited to, real-time traffic updates, construction updates, etc.

The real-time traffic module 118 may include software and routines for aggregating real-time traffic data and, in some instances, serving requests for the real-time traffic data. For instance, the real-time traffic module 118 may collect data from mobile computing systems 108, client devices 110, traffic cameras, traffic sensors, or other real-time data gathering devices and may, for instance, in response to a request by a navigation application 112, provide the real-time data to the navigation application 112. It should be noted that real-time data may include certain delays due to latency, processing, transfer time, etc.

In some implementations, the map storage 134 may include map data, such as the locations (e.g., GPS), interconnections, shapes, etc., of roads. The map data may include identifications of roadway segments, roadway junctions, lanes, traffic signal locations, etc.

In some implementations, the historical roadway traffic data 136 may include traffic data that may be time dependent, and/or averaged over time, travelers, or vehicles. The historical roadway traffic data 136 may be gathered by aggregating data from mobile computing systems 108, client devices 110, traffic cameras, or other traffic monitoring devices.

In some implementations, the roadway geometry data 138 may include, for example, data representing the shape, width, length, etc., of roads. For example, the roadway geometry data 138 may include whether and how roads or lanes merge, diverge, meet in an intersection, or curve, etc. In some instances, the roadway geometry data 138 may include identifications of links between roadway segments and roadway junctions, such as a mapping between a roadway segment and roadway junctions connected with the roadway segment, a mapping of lanes of a roadway segment to roadway junctions, or other geometric data.

In some implementations, traffic signal data 140 may include attributes of traffic signals, such as the locations, lanes associated with the signals, sizes, etc., of intersections, ramp meters, and other traffic signals. In some instances, the traffic signal data 140 may also include timing data, such as the timing, frequency, or trigger information of traffic signals.

Figure 2:
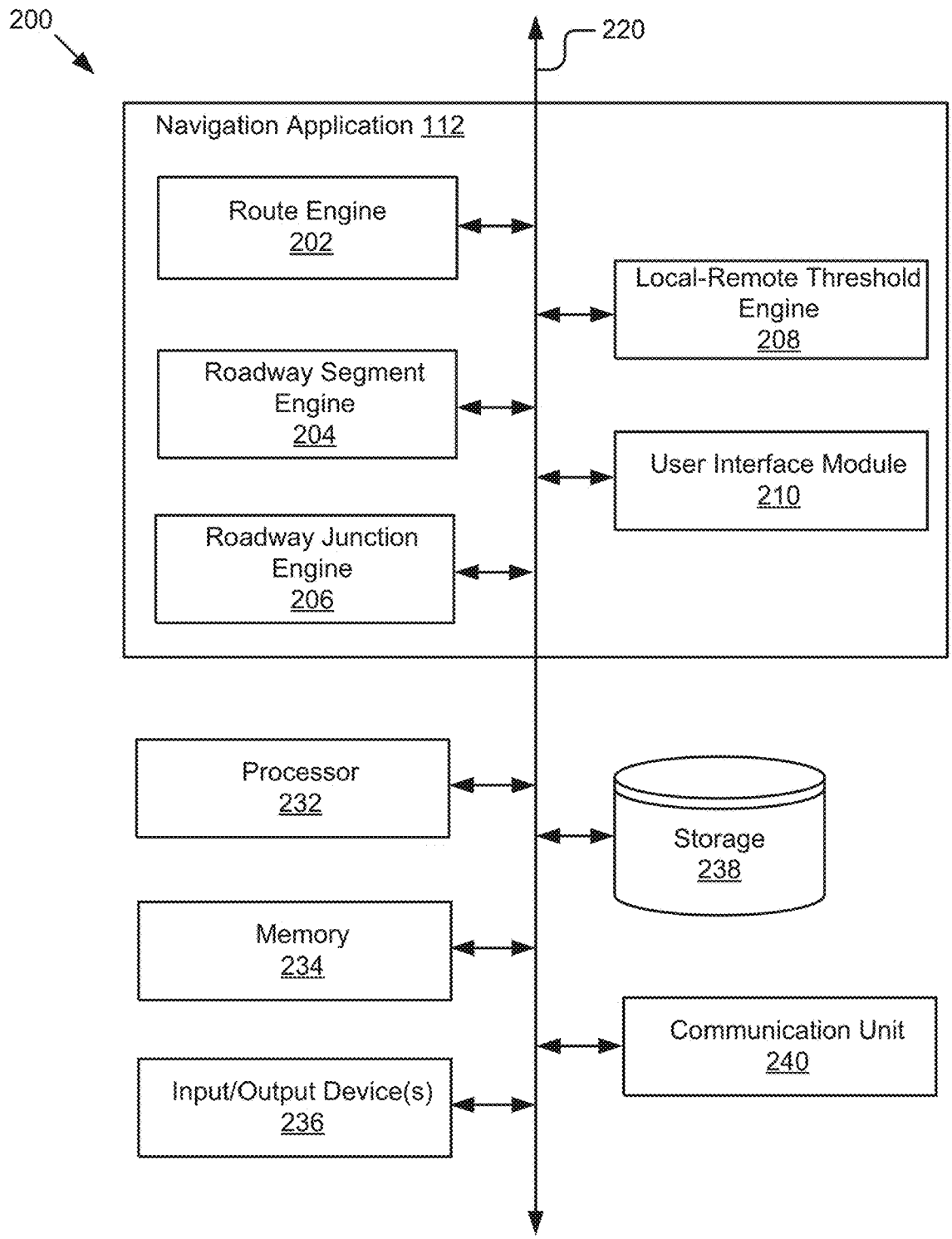
FIG. 2 is a block diagram illustrating an example computing device that includes a navigation application.

Referring now to FIG. 2, an example of the navigation application 112 is shown in more detail. FIG. 2 is a block diagram of a computing device 200 that includes a navigation application 112, a processor 232, a memory 234, input/output device(s) 236, a storage device 238, and a communication unit 240 according to some implementations. The components of the computing device 200 are communicatively coupled by a bus 220. The computing device 200 may represent a navigation server 104, client device 110, or mobile computing system 108 depending on the implementation.

The processor 232 may include an arithmetic logic unit, a microprocessor, a general purpose controller, or some other processor array to perform computations and, in some instances, provide electronic display signals to a display device. The processor 232 is coupled to the bus 220 for communication with the other components. Processor 232 processes data signals and may include various computing architectures including a complex instruction set computer (CISC) architecture, a reduced instruction set computer (RISC) architecture, or an architecture implementing a combination of instruction sets. Although FIG. 2 illustrates a single processor 232, multiple processors 232 may be included. Other processors, operating systems, sensors, displays and physical configurations are possible.

The memory 234 may store instructions and/or data that can be executed by the processor 232. The memory 234 may be coupled to the bus 220 for communication with the other components. The instructions and/or data may include code for performing the techniques described herein. The memory 234 may be a dynamic random access memory (DRAM) device, a static random access memory (SRAM) device, flash memory or some other memory device. In some implementations, the memory 234 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 240 transmits and receives data to and from the navigation application 112. The communication unit 240 may be coupled to the bus 220. In some implementations, the communication unit 240 includes a wireless transceiver for exchanging data with the other components in the computing device 200 or other communication channels using one or more wireless communication methods, including IEEE 802.11, IEEE 802.16, BLUETOOTH® or another suitable wireless communication method.

In some implementations, the communication unit 240 includes a cellular communications transceiver for sending and receiving data over a cellular communications network including via short messaging service (SMS), multimedia messaging service (MMS), hypertext transfer protocol (HTTP), direct data connection, WAP, e-mail or another suitable type of electronic communication. In some implementations, the communication unit 240 includes a wired port and a wireless transceiver. The communication unit 240 also provides other conventional connections to the network 102 for distribution of files and/or media objects using standard network protocols including TCP/IP, HTTP, HTTPS and SMTP, etc.

The storage device 238 can be a non-transitory memory that stores data for providing the functionality described herein. The storage device 238 may be a dynamic random access memory (DRAM) device, a static random access memory (SRAM) device, flash memory or some other memory devices. In some implementations, the storage device 238 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated implementation, the storage device 238 is communicatively coupled to the bus 220. In one implementation, the storage device 238 includes route data, map data, or other data described, for example, in reference to 132, 142, or 144. For example, the storage device 238 may store other data for providing the functionality described herein.

The input/output device(s) 236 are hardware for receiving input and/or providing output. For example, the input/output device(s) 236 may include speakers to produce sound (e.g., audio instructions corresponding to the route), microphones to record sound (e.g., feedback from the user) and other sensors or feedback devices like accelerometers. Optionally, the input/output device(s) 236 may include one or more analog-to-digital or digital-to-analog converters, and/or one or more digital signal processors to facilitate audio processing. These input/output device(s) 236 are coupled to the bus 220 for communication with the processor 232 and the memory 234. Optionally, a microcontroller may be added as part of the input/output device(s) 236 to facilitate power systems control, as well as off-load the main processor 232 from lower-speed lesser-important tasks.

Although not illustrated, the computing device 200 may include one or more devices for determining its location. For instance, the computing device 200 may include a GPS receiver, Wi-Fi radio, cellular radio, or other device capable of or configured to determine the current location of the computing device 200.

In the illustrated implementation shown in FIG. 2, the navigation application 112 may include a route engine 202, roadway segment engine 204, roadway junction engine 206, local-remote threshold engine 208, and/or a user interface module 210. In some implementations, the components of the navigation application 112 may be communicatively coupled via the bus 220. In some embodiments, the navigation application 112, the route engine 202, the roadway segment engine 204, the roadway junction engine 206, the local-remote threshold engine 208, and/or the user interface module 210 may be implemented using software executable by one or more processors of one or more processors and/or computing devices, using hardware, such as but not limited to a field-programmable gate array (FPGA), an application-specific integrated circuit (ASIC), etc., and/or a combination of hardware and software, etc.

The route engine 202 may comprise software and/or hardware logic executable to request map data and route data from the data server 106. In one implementation, the route engine 202 can be a set of instructions executable by the processor 232 to provide the functionality described below for estimating transit times, etc., generating routes, requesting map data and route data from the data server 106, etc.

In some implementations, the route engine 202 generates a request for a map and sends the request for the map to the data server 106. For example, the route engine 202 may generate a request for a map covering San Jose area in California. The map data can include multiple freeways and intersections in San Jose, historical routes traveled by users, geographic location (e.g., GPS) data describing maps, roadway segments and roadway junctions, and other data from the data server 106, for example.

In some implementations, the route engine 202 sends map data describing a map and route data to one or more of the other components of the navigation application 112. In some implementations, the route engine 202 stores map data, routes, or other data received or processed by the route engine 202 in the storage 238.

The roadway segment engine 204 may comprise software and/or hardware logic executable to identify roadway segments and calculating their travel times, for example as described in further detail below. In some implementations, the roadway segment engine 204 may differentiate roadway segments as local and remote, for instance, based on a threshold determined by the local-remote threshold engine 208.

The roadway junction engine 206 may comprise software and/or hardware logic executable to identify roadway junctions and calculating their travel times, for example as described in further detail below. In some implementations, the roadway segment engine 204 may differentiate roadway junctions as local and remote, for instance, based on a threshold determined by the local-remote threshold engine 208.

The roadway junction engine 206 may determine the impact of traffic on the time to pass through a roadway junction or, for instance, the time added to the route at roadway junctions in the route. In some implementations, the roadway junction engine 206 may differentiate the delays at the left turn, through, and right-turn movements in order to account them separately in the estimation of vehicle route travel times and, in some instances, eliminate certain time consuming movements from the route.

The local-remote threshold engine 208 may comprise software and/or hardware logic executable to determine thresholds for differentiating local from remote roadway segments and/or roadway junctions. A threshold may be used, for instance, by the roadway segment engine 204, roadway junction engine 206, or another component of the navigation application 112, to determine whether to classify particular roadway segment or roadway junction as local or remote for the purposes of the technologies described herein. For instance, segments or roadway junctions that are closer than a threshold may be classified as "local" while segments or roadway junctions that are farther than the threshold may be classified as "remote." It should be noted that segments or roadway junctions that fall exactly on the threshold may be defined as either local or remote as a design choice, that is, the threshold maybe inclusive or exclusive of exact values.

The threshold may be defined in terms of a radius from a location (e.g., of a mobile computing system 108, client device 110, or user interacting with one of these devices and manually inputting the location) or may be defined as a distance along roadways from the location. Additionally or alternatively, the local-remote threshold engine 208 may define the threshold defined dynamically based on additional factors, such as an estimated travel time of a vehicle from its location. For instance, if a route includes high speed travel, such as by freeway, the threshold may be defined as a farther distance from the location.

It should be noted that, in some implementations, a first threshold may be defined for roadway segments and a separate threshold may be defined for roadway junctions, for example, because accuracy of various methods of predicting travel times/delays at roadway segments may change differently over time than those for roadway junctions. Further, it should be noted that a threshold may be defined for specific types of roadway segments and/or roadway junctions. For instance, a threshold may be defined or weighted differently for a freeway on-ramp than for a small intersection, in response to a determination that a delay at the freeway on-ramp is less volatile than a delay at a small intersection.

While, in some implementations, the threshold may be a manually entered value provided by a system administrator, in some implementations, the threshold may be a machine calibrated value. The local-remote threshold engine 208 may use computer learning algorithm(s) to determine or calibrate a fixed or dynamic threshold value based on a deviation among local roadway junction travel times, remote roadway junction travel times, and measured travel times. In some implementations, a threshold value may be automatically adjusted or weighted based on a comparison between the real world observations and predictions of the methods of determining impact/delay as described herein. In some implementations, the local-remote threshold engine 208 may track deviations or volatility in real-time traffic, delay, queues, etc., of a roadway junction and adjust the threshold based on the volatility. For instance, if it is determined that the delay due to traffic at a freeway on-ramp is relatively constant over a 10 minute period but can vary substantially during periods longer than 10 minutes, the local-remote threshold engine 208 may set the threshold to be 10 minutes or a distance that is projected to be traveled in a 10 minute period.

The user interface module 210 can may comprise software and/or hardware logic executable to generate a user interface for displaying useful information of a route for a user. In one implementation, the user interface module 210 can be a set of instructions executable by the processor 232 to provide the functionality described below for generating a user interface for displaying useful information of a route for a user. In another implementation, the user interface module 210 can be stored in the memory 234 of the computing device 200 and can be accessible and executable by the processor 232. In either implementation, the user interface module 210 can be adapted for cooperation and communication with the processor 232 and other components of the computing device 200.

In some implementations, the user interface module 210 receives instructions from the route engine 202 to generate a user interface for displaying information regarding calculated routes, travel times, estimated times of arrival, etc. The information may also include attractions and amenities along a route. In another example, the information also includes traffic delay information and road closure information associated with the route. In some implementations, the user interface module 210 transmits the user interface data including the useful information to a client device 110 or a mobile computing system 108, causing the client device 110 or the mobile computing system 108 to display the user interface including useful information to the user.

Figure 3:
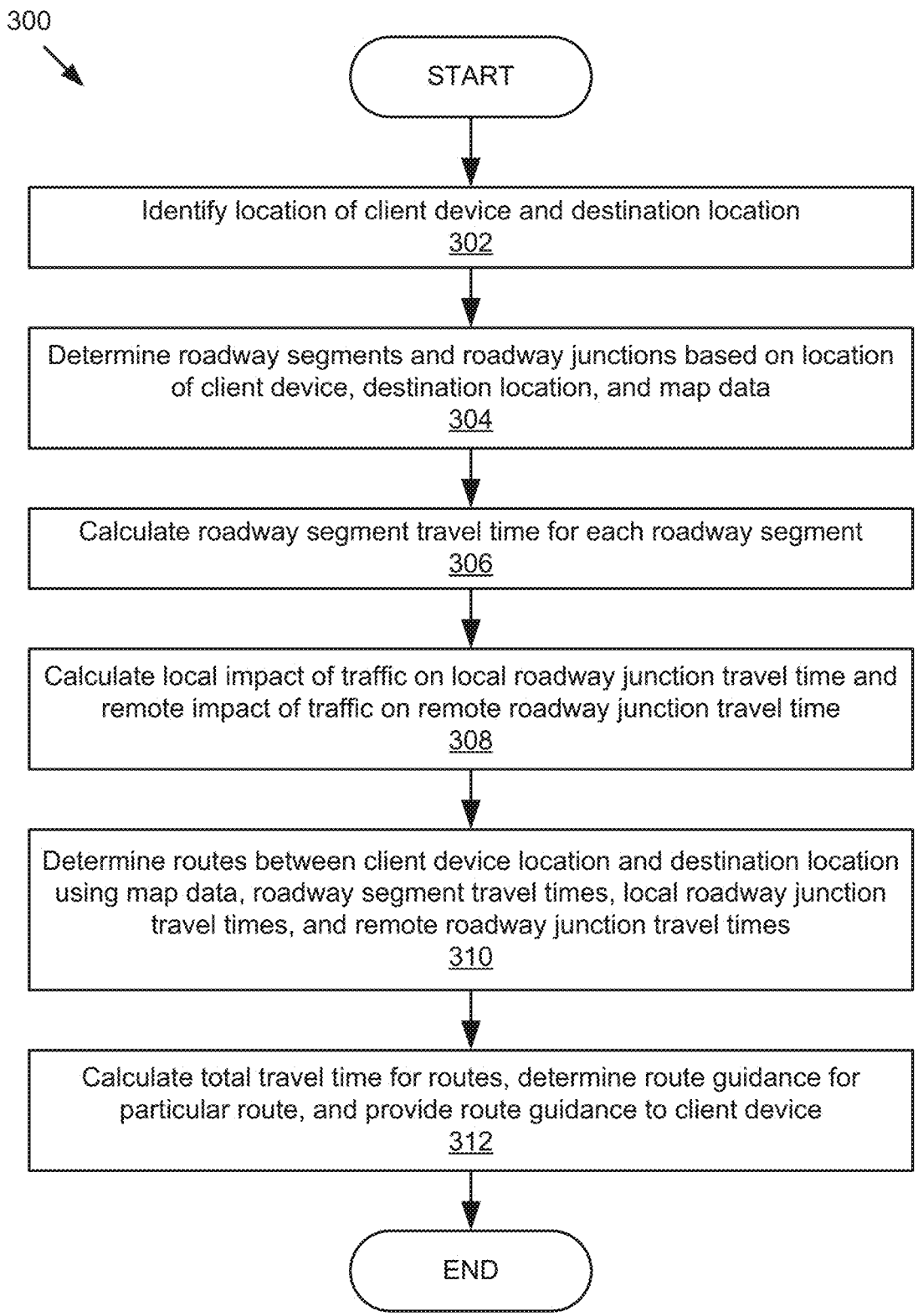
FIG. 3 is a flow diagram of an example method for generating navigation routes using roadway junction impact.

FIG. 3 is a flow diagram of an implementation of a method 300 for generating navigation routes using roadway junction impact. For instance, the system 100 may calculate a travel time of the roadway segments and roadway junctions in a roadway network using historical and real-time traffic conditions.

Figure 4A:
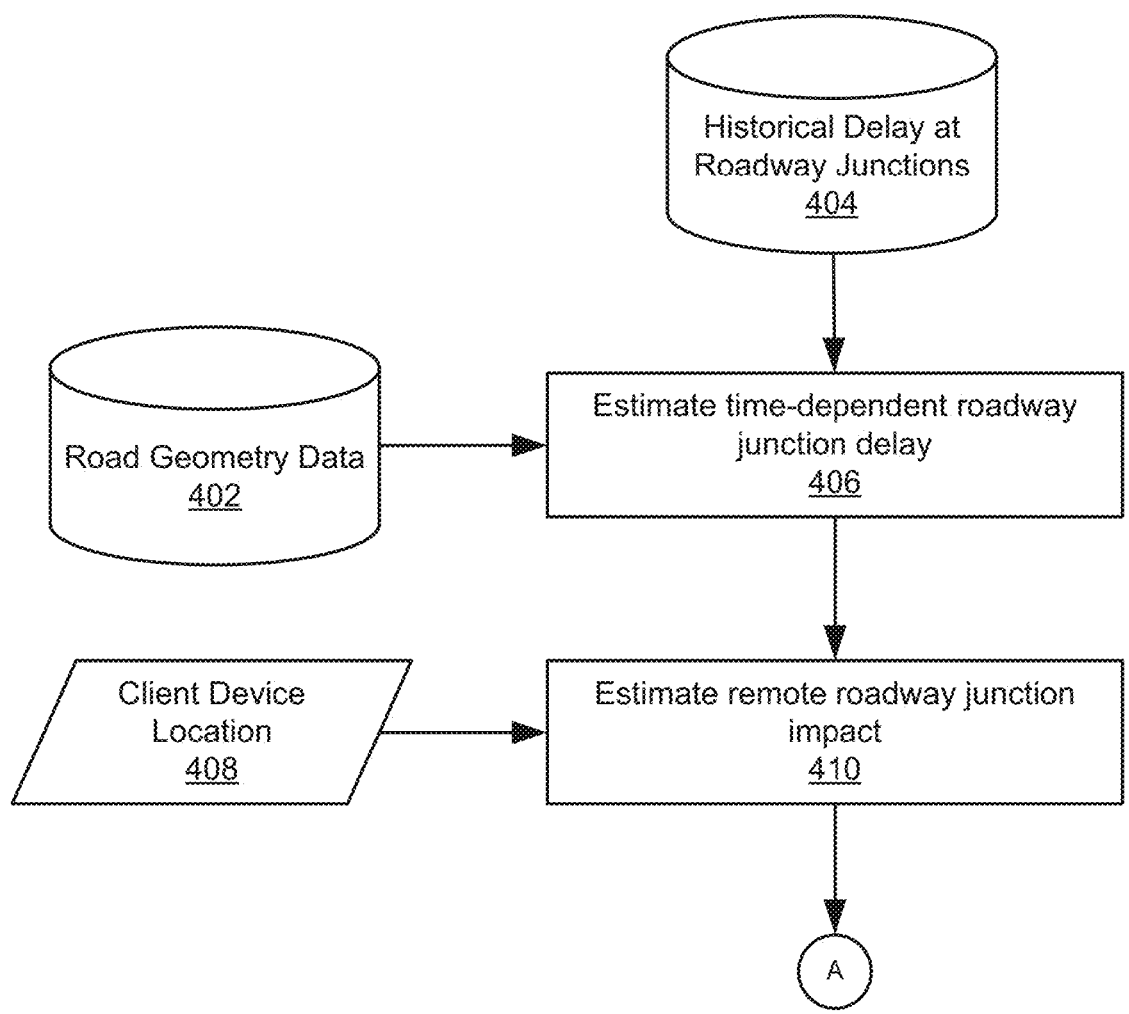
FIG. 4A is a flow diagram of an example method for calculating a remote roadway junction impact.
Figure 4B:
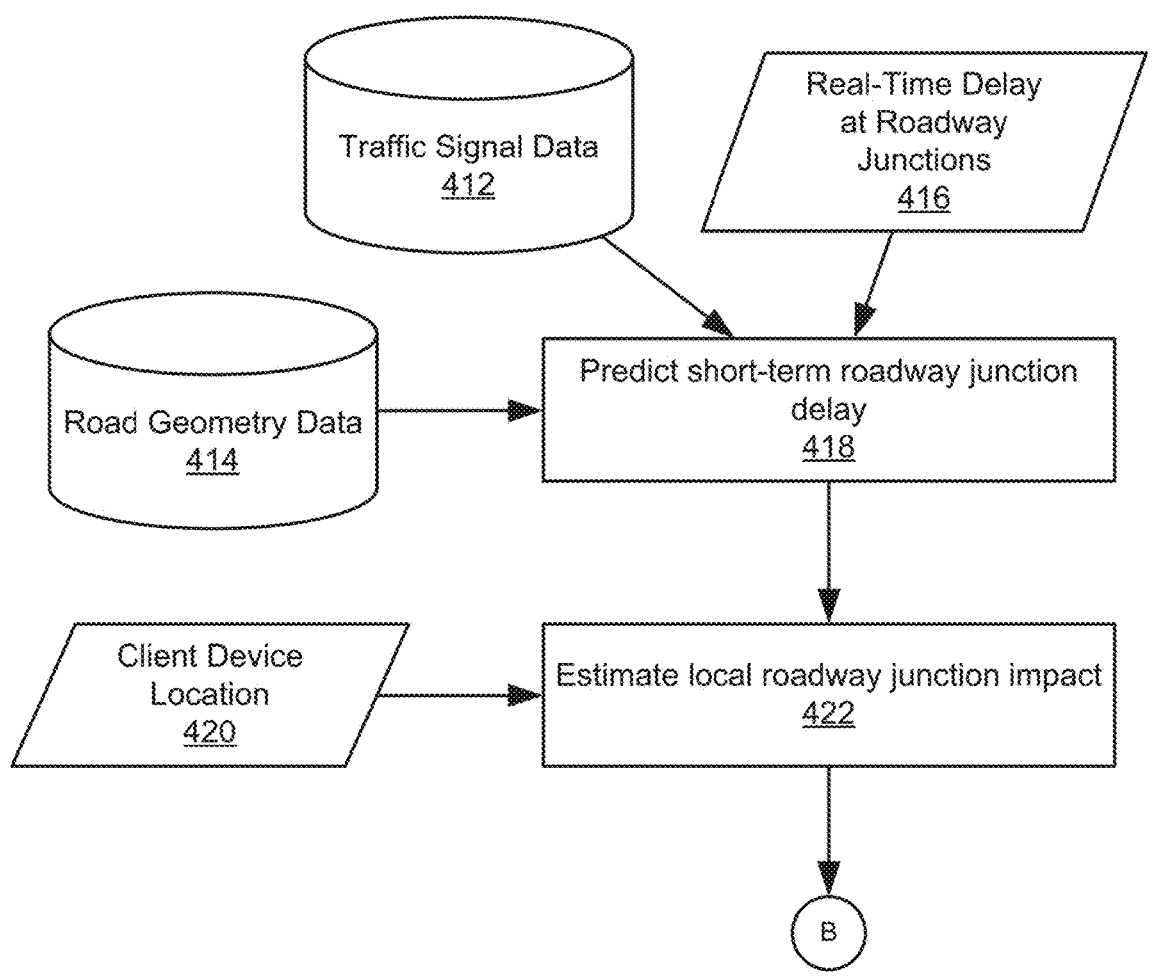
FIG. 4B is a flow diagram of an example method for calculating a local roadway junction impact.
Figure 4C:
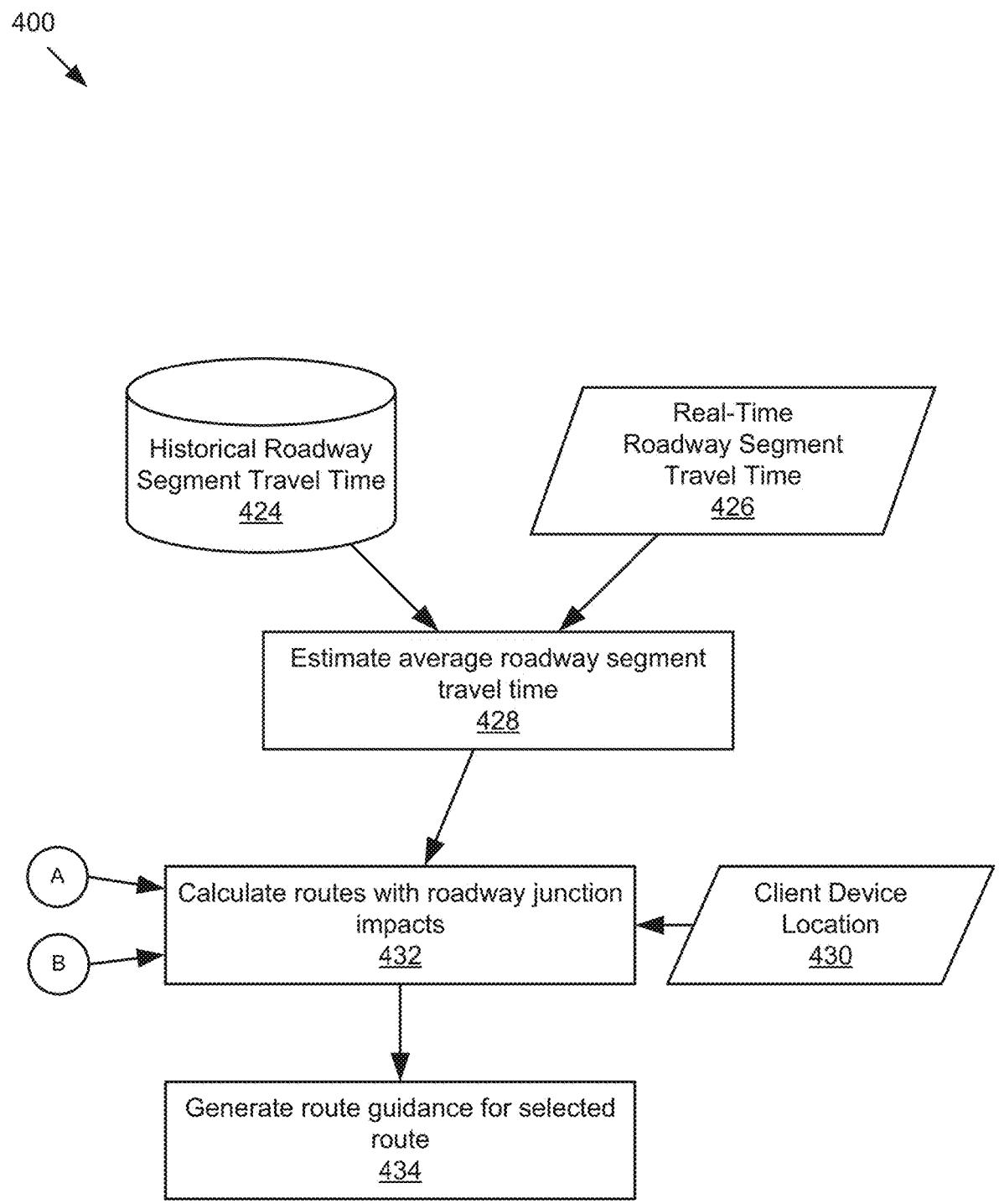
FIG. 4C is a flow diagram of an example method for calculating a roadway segment travel time and generating a route.

At 302, the navigation application 112 may identify a location of a client device 110 (it should be noted that, although the client device 110 is referred to in reference to FIGS. 3-4C, the mobile computing system 108 may also or alternatively be used) and a destination location. For instance, the navigation application 112 may receive the location of the client device 110 based on GPS, cellular network triangulation, etc. Similarly, the navigation application 112 may receive the destination location as input from a user, depending on the implementation.

At 304, the navigation application 112 may determine a plurality of roadway segments and a plurality of roadway junctions based on the first location of the client device, the destination location, and map data. For instance, the navigation application 112 may determine the roadway segment and roadway junctions in a navigation network, which may include, for instance, roads that are near (e.g., within a defined distance, in the same city, etc.) the location of the client device 110, roads that are along potential routes calculated between the location of the client device 110 and the destination location based on the map data, depending on the implementation. For instance, in some implementations, the navigation application 112 may calculate a set of potential routes between the location of the client device 110 and the destination location to reduce the total set of data for which calculations are made. In some instances, the plurality of roadway segments and plurality of roadway junctions may include local roadway segments, local roadway junctions, remote roadway segments, and/or remote roadway junctions.

At 306, the navigation application 112 may calculate a roadway segment travel time for roadway segments of the plurality of roadway segments. For instance, the roadway segment travel times may be determined based on real-time traffic data, historical travel times on the particular roadway segment, or other data, for instance received from the real-time traffic module 118, historical roadway traffic data 136 storage, or other components of the system 100. In some implementations, as described elsewhere herein, local and remote roadway segments may be differentiated and their travel times may be determined, for instance, based on real-time and historical traffic or travel time data. For instance, the determination of roadway segment travel times may be performed as described in the example implementation of FIG. 4C.

At 308, the navigation application 112 may calculate a local impact of traffic on a local roadway junction travel time for the local roadway junctions and a remote impact of traffic on a remote roadway junction travel time for the remote roadway junctions. In some instances, a system, such as the data server 106, has real-time and/or historical travel time data (e.g., delays, impacts, average travel times, etc.) calculated for the local and remote roadway junctions, and the navigation application 112 retrieves the appropriate dataset for the roadway junctions, whether local or remote. For instance, the navigation application 112 (e.g., by the roadway junction engine 206) may differentiate between local and remote roadway junctions based on a threshold, as discussed in further detail above. Example operations for calculating a remote impact of traffic on a remote roadway junction travel time for a remote roadway junction are described in further detail in reference to FIG. 4A, for instance. Example operations for calculating a local impact of traffic on a local roadway junction travel time for a local roadway junction are described in further detail in reference to FIG. 4B, for instance.

At 310, the navigation application 112 may determine a set of routes between the location of the client device and the destination location using one or more of map data, roadway segment travel times, local roadway junction travel times, and remote roadway junction travel times of the roadway segments, local roadway junctions, and remote roadway junctions, respectively. For instance, the navigation application 112 may select among the roadway segments and roadway junctions to connect the location of the client device 110 and the destination location and may, for example, select a route(s) with the shortest distances and or shortest total travel times.

At 312, the navigation application 112 calculate the total travel time of each of the set of calculated routes based on, for instance, the roadway segment travel time, local roadway junction travel times, and remote roadway junction travel times. For example, calculating the total travel time may include determining each of the roadway segments and roadway junctions in a given route and adding the travel time for each of the roadway segments and roadway junctions together.

In some implementations, the navigation application 112 may determine route guidance data, such as turn by turn directions, for a particular route selected from the set of routes using the total travel time. In some implementations, the navigation application 112 may provide an interface to a user to indicate potential routes and their total travel times or estimated times of arrival. The navigation application 112 may receive input from the user selecting a particular route.

In some implementations, the navigation application 112 may select the particular route from the set of routes based on a total travel time and a stored user preference for certain route features. For instance, the navigation application 112 may automatically select a particular route or rank the set of routes based on the total travel time and/or a user preference. For example, the navigation application 112 may determine that a user has a preference (e.g., explicitly provided by the user or learned by the navigation application 112 from previous user interactions) to take a route with the shortest total travel time, in which circumstance the navigation application 112 may automatically select the route with the shortest total travel time. In some implementations, the user preference may indicate other conditions, for example, such as a preference for avoiding toll roads, in which circumstance, the navigation application 112 may automatically exclude out routes with toll roads (or not calculate routes using toll roads at all).

In some implementations, the navigation application 112 may provide route guidance for the selected particular route to the client device 110 based on the route guidance data. In some implementation, the route guidance may include turn by turn directions provided in real-time to the client device 110 during travel.

In some implementations, the navigation application 112 may recalculate the route and/or travel times during route guidance. For instance, providing the route guidance for the particular route to the client device based on the route guidance data may include periodically modifying the particular route based on a second location of the client device during transit of the particular route by the client device. For example, based on a driver or system specified frequency, the navigation application 112 may determine a current client device 110, recalculate the travel times, and recalculate routes during transit. In some implementations, the threshold range at which roadway segments or roadway junctions are classified as local or remote may be recalculated based on the updated client device 110 location.

FIG. 4A is a flow diagram of an implementation of a method 400 for calculating a remote roadway junction impact. The operations described in reference to FIG. 4A may calculate the remote (e.g., as defined by the threshold and discussed above) impact of traffic on a remote roadway junction travel time. The remote impact may include a recurrent time-dependent delay captured by historical information.

At 402, the roadway junction engine 206 may determine road geometry information (whether for all relevant roadway junctions or only those that are remote). The roadway junction engine 206 may retrieve road geometry data from the map storage 134 and/or roadway geometry data 138 on the data server 106. For instance, the road geometry data may include the location, connected roadway segments, size, shape, traffic signal information, or other data pertaining to the roadway junctions, depending on the implementation. In some instances, road geometry data may include basic roadway segments, merging and diverging sections, and roadway junctions associated to intersections, which the roadway junction engine 206 my use to identify possible roadway junctions from one roadway segment to others, as well as, in some implementations, lanes associated with roadway junctions.

At 404, the roadway junction engine 206 may determine historical time delay at one or more remote roadway junctions. For instance, the roadway junction engine 206 may retrieve the historical delay at the roadway junctions in a route (e.g., those roadway junctions that are "remote" or beyond the threshold), or set of potential routes, from the historical roadway traffic data 136 on the data server 106. As discussed above, the delay or impact of traffic may include the time that a vehicle waits at a roadway junction before proceeding to the next roadway segment. In some instances, the delay or impact of traffic may take into consideration one or more of a waiting time at a traffic signal, a vehicle queue, an accident, or other factors that may impact the travel time of a vehicle through a roadway junction.

At 406, the roadway junction engine 206 may estimate a time-dependent roadway junction delay. For instance, the roadway junction engine 206 may calculate the remote impact of traffic based on the historical time delay and, in some implementations, other attributes of the roadway junctions. For instance, the roadway junction engine 206 may determine that a given roadway junction has a current delay from a first roadway segment to a second roadway segment based on a historical wait time (e.g., taken as an average or other statistical measure) of past vehicles at the intersection. In some implementations, this data may be calculated at the time of the data request or may be calculated previously and stored in a cache at the client device 110 or historical roadway traffic data 136 on the data server 106, for quick access.

At 408, the roadway junction engine 206 may receive client device 110 location, for instance, from the client device 110, and at 410, the roadway junction engine 206 may estimate a time-dependent roadway junction delay or traffic impact for the roadway junctions relative to the client device location and/or potential routes between the client device 110 location and destination location. It should be noted that, in some implementations, the roadway junction engine 206 may first identify the current location of the client device 110 and differentiate roadway junctions as local and distant roadway junctions (e.g., prior to retrieving information at 402-406).

FIG. 4B is a flow diagram of an implementation of the method 400 for calculating a local roadway junction impact. For instance, FIG. 4B may illustrate operations concerning a local impact of traffic on a local roadway junction travel time. The local impact may be defined as a short-term (e.g., within the threshold time or distance described above) predicted delay at a roadway junction. In some implementations, the some or all of the operations described in reference to FIG. 4B may be performed in parallel with or subsequent to those described in reference to those described in reference to FIG. 4A.

At 412-416, the roadway junction engine 206 may receive local roadway junction information of a local roadway junction including attributes of the local roadway junction.

At 412, the roadway junction engine 206 may receive traffic signal data, for instance from the traffic signal data 140 storage on the data server 106. For instance, as described above, the traffic signal data may include data regarding intersection signals, ramp meters, etc.

At 414, the roadway junction engine 206 may retrieve road geometry data, for instance, as described in reference to 402 above. In some instances, at this step, the roadway junction engine 206 may retrieve the road geometry data for only those roadway junctions that are classified as local, for all roadway junctions, or the road geometry data may be retrieved for the local roadway junctions may be retrieved together with the data for the remote roadway junctions at 402 in a batch.

At 416, the roadway junction engine 206 may determine a real-time delay at the local roadway junction(s), for instance, based on receiving real-time delay (or travel time) data from the real-time traffic module 118. In some implementations, to preserve bandwidth and improve system performance, the roadway junction engine 206 may receive or retrieve the real-time information for local roadway junctions but not remote roadway junctions.

At 418, the roadway junction engine 206 may predict a short-term (e.g., within the threshold) roadway junction delay. For instance, the real-time delay observed at the roadway junctions, such as vehicle queue length, traffic signals of the next two or three downstream intersections, and road geometry information, may be applied to make a short-term prediction about the vehicle queues and delays at the roadway junctions, as such, the roadway junction engine 206 may calculate a local impact of traffic based on the real-time delay and attributes of the roadway junction.

At 420, the roadway junction engine 206 may receive client location. This may be the same data received at 408 or may be retrieved again at 420. At 422, the roadway junction engine 206 may estimate the local roadway junction impact for local roadway junctions, for example, based on the predicted short-term delay and the location of the client device 110.

FIG. 4C is a flow diagram of an implementation of the method 400 for calculating a roadway segment impact and generating a route. For instance, the navigation application 112 may calculate routes with roadway segment travel times and roadway junction travel times. In some implementation, the roadway segment engine 204 may determine the roadway segment travel times for the plurality of roadway segments using some or all of the operations described in reference to FIG. 4C.

At 424, the roadway segment engine 204 may retrieve historical roadway segment travel times. For instance, the roadway segment engine 204 may retrieve data from the historical roadway traffic data 136 storage on the data server 106. The historical roadway segment travel time may describe a past travel time of vehicles traveling through roadway segments.

At 426, the roadway segment engine 204 may receive real-time roadway segment travel times. For instance, the roadway segment engine 204 may communicate with the real-time traffic module 118 on the data server 106 to receive the real-time data. The historical roadway segment travel time may describe a past travel time of vehicles traveling through roadway segments, for example, based on traffic monitoring, speed limits, roadway segment geometry, etc., as described above.

In some implementations, the roadway segment engine 204 may identify one or more local roadway segments and/or one or more remote roadway segments based on a threshold and may determine travel times for each segment. For instance, a local roadway segment may be within the threshold distance and a remote roadway segment may exceed the threshold distance. In some such instances, the roadway segment engine 204 may use the historical roadway segment travel time for the remote roadway segments and the real-time roadway segment travel time for the local roadway segments, for instance, as described in reference to the local and remote roadway junctions above.

For example, the roadway segment engine 204 may determine a local roadway segment travel time based on a real-time travel time of an object (e.g., one or more mobile computing systems 108, client devices 110, or other vehicles) traveling through a roadway segment. The roadway segment engine 204 may determine a remote roadway segment travel time based on a historical travel time of an object through a remote roadway segment.

In some implementations, at 428, the roadway segment engine 204 may estimate an average roadway segment travel time, for instance, based on the historical roadway segment travel time and/or the real-time roadway segment travel time. In some implementations, the roadway segment engine 204 may estimate an average travel time for the roadway segments in a route, or set of routes, depending on the implementation.

At 432, the route engine 202 may calculate routes using the roadway junction impacts, for instance based on one or more of the local roadway junction travel times, remote roadway junction travel times, roadway segment travel times, and client device 110 location (e.g., received at 430, 408, or 420). In some implementations, the route engine 202 may further take user preferences (e.g., for avoiding highways, toll roads, etc.) into consideration in its determination of routes, as described above. In some implementations, the route engine 202 may generate one or a set of routes tracing roads from an origin location to a destination location and may take into consideration the segment and roadway junction travel times described above in selecting the most effective route.

At 434, the route engine 202 may generate route guidance for a selected route of the calculated routes and provide the route guidance to a mobile computing system 108 or client device 110, for example, as described in reference to FIG. 3.

Figure 5A:
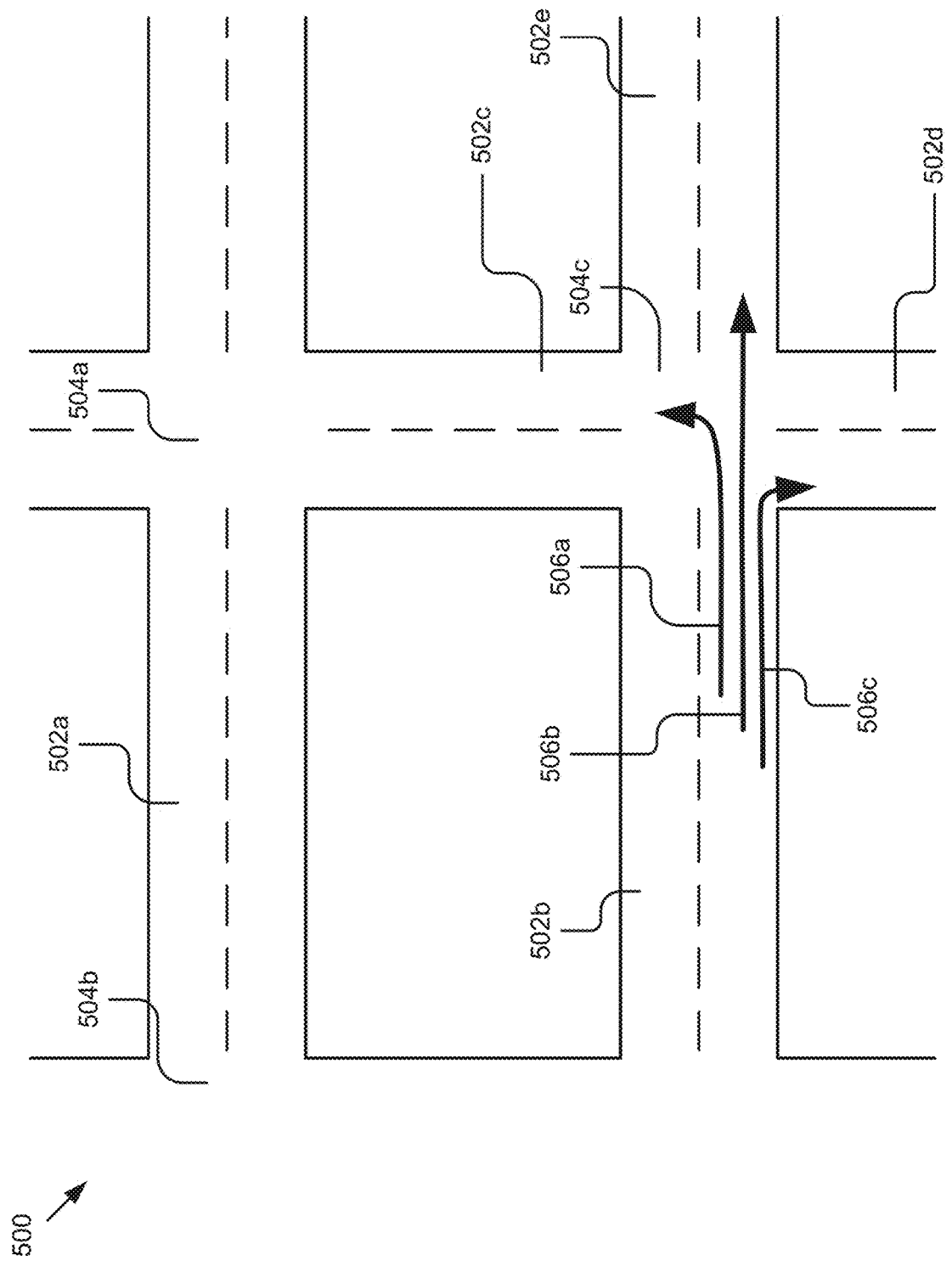
FIG. 5A is an illustration of example roadway segments and roadway junctions.

FIG. 5A illustrates a diagram 500 of example roadway segments 502 and roadway junctions 504. As illustrated, a roadway segment 502a, 502b, 502c, 502d, and 502e may include a section of road between intersections or other roadway junctions. As illustrated, roadway junctions 504a, 504b, and 504c are connections linking roadway segments 502.

Arrows 506a, 506b, and 506c, illustrate potential routes between roadway segments 502. In some implementations, the arrows 506 represent individual roadway junctions defined on a turn and/or lane level, although, it should be noted that, in some implementations, roadway junctions may be defined on an intersection level (e.g., connecting 2 or more segments, as in 504c).

For example, arrow 506a connects roadway segment 502b to roadway segment 502c (e.g., as a directional left turn), arrow 506b connects roadway segment 502b to roadway segment 502e (e.g., as a through or straight movement), and arrow 506c connects roadway segment 502b to roadway segment 502d (e.g., as a directional right turn).

Figure 5B:
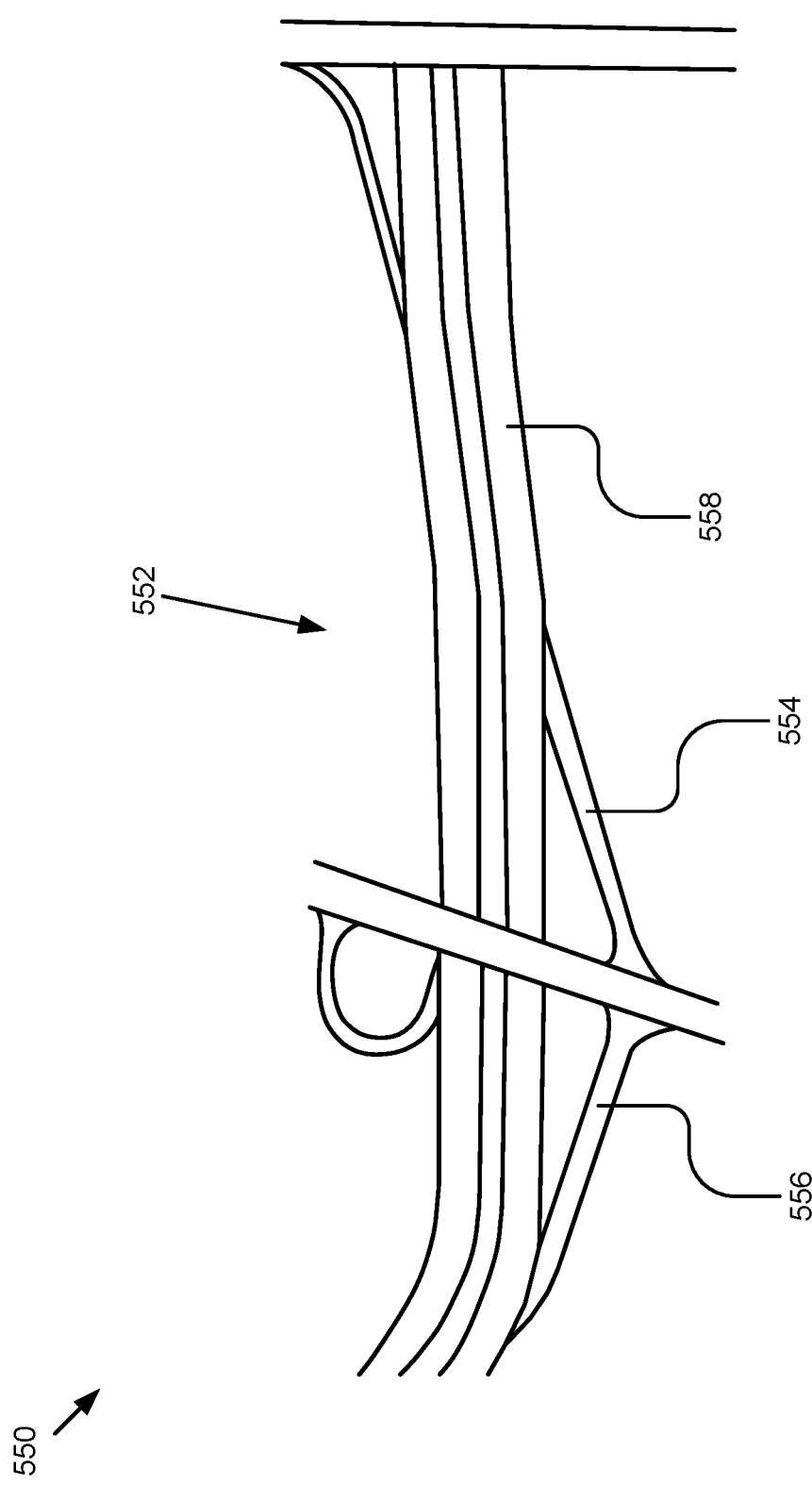
FIG. 5B is an illustration of an example freeway with an on-ramp, an off-ramp, and a roadway segment.

FIG. 5B illustrates a diagram 550 of an example freeway 552 with an on-ramp 554, an off-ramp 556, and a roadway segment 558. An on-ramp 554 and off-ramp 556 may include meters, etc., as described above. In some implementations, due to the non-trivial length of on-ramps 554 and off-ramps 556, the navigation application 112 may take the length and average travel speed, for instance, into consideration in determining the roadway junction travel times, and in other implementations, this consideration may be built into the roadway junction travel times/delays described above. Similarly, while a freeway roadway segment 558 may be defined as a distance between on-ramps 554 and off-ramps 556, it should be noted that a roadway segment may have roadway junctions along its length, not merely at its ends and may therefore be defined as a longer or continuous road, depending on the implementation.

In the forgoing description, for purposes of explanation, numerous specific details are set forth in order to provide a thorough understanding of the invention. It will be apparent, however, to one skilled in the art that the implementations can be practiced without these specific details. In other instances, structures and devices are shown in block diagram form in order to avoid obscuring the invention. For example, the invention is described in some implementations with reference to client devices and particular software and hardware. However, the description applies to any type of computing device that can receive data and commands, and any peripheral devices providing services.

Reference in the specification to "one implementation" or "an implementation" means that a particular feature, structure, or characteristic described in connection with the implementation is included in at least one implementation. The appearances of the phrase "in one implementation" in various places in the specification are not necessarily all referring to the same implementation.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some implementations can take the form of a hardware implementation, a software implementation or an implementation containing both hardware and software elements. An implementation may be implemented in software, which includes but is not limited to firmware, resident software, microcode, etc.

Furthermore, some implementations can take the form of a computer program product accessible from a computer-usable or computer-readable medium providing program code for use by or in connection with a computer or any instruction execution system. For the purposes of this invention, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code is retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various implementations as described herein.

The foregoing description of the implementations has been presented for the purposes of illustration and description. It is not intended to be exhaustive or to limit the specification to the precise form disclosed. Many modifications and variations are possible in light of the above teaching. It is intended that the scope of the implementations be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
    identifying, by a processor, a first location of a client device and a destination location, the first location of the client device being identified using a positioning system sensor coupled with the client device;
    determining, by the processor, a plurality of roadway segments and a plurality of roadway junctions based on the first location of the client device, the destination location, and map data, the plurality of roadway junctions including one or more local roadway junctions below a threshold and one or more remote roadway junctions above the threshold;
    calculating, by the processor, a roadway segment travel time for each roadway segment of the plurality of roadway segments;
    receiving, by the processor, real-time traffic data for the one or more local roadway junctions from one or more data servers;
    receiving, by the processor, historical traffic data for the one or more remote roadway junctions;
    calculating, by the processor, a local impact of traffic on a local roadway junction travel time for each of the one or more local roadway junctions using the real-time traffic data and a remote impact of traffic on a remote roadway junction travel time for each of the one or more remote roadway junctions using the historical traffic data;
    determining, by the processor, a set of routes between the first location of the client device and the destination location using the map data, the roadway segment travel times for the plurality of roadway segments, the local roadway junction travel times of the one or more local roadway junctions, and the remote roadway junction travel times of the one or more remote roadway junctions;
    calculating, by the processor, a total travel time for each route in the set of routes based on the roadway segment travel times, the local roadway junction travel times, and the remote roadway junction travel times;
    determining, by the processor, route guidance data for a particular route selected from the set of routes; and
    providing, by the processor, route guidance for the particular route to the client device based on the route guidance data.

2. The computer-implemented method of claim 1, wherein calculating the local impact of traffic on the local roadway junction travel time includes
   receiving, by the processor, local roadway junction information of a given local roadway junction including a real-time delay at the given local roadway junction, the given local roadway junction including one or more of a traffic signal, intersection, freeway onramp, and freeway off-ramp, and
   calculating, by the processor, the local impact of traffic based on the real-time delay.

3. The computer-implemented method of claim 1, wherein calculating the remote impact of traffic on the remote roadway junction travel time includes
   receiving, by the processor, remote roadway junction information of a given remote roadway junction including a historical time delay at the given remote roadway junction, the given remote roadway junction including one or more of a traffic signal, intersection, freeway onramp, and freeway off-ramp, and
   calculating, by the processor, the remote impact of traffic based on the historical time delay.

4. The computer-implemented method of claim 1, wherein the plurality of roadway segments include a local roadway segment within the threshold and a remote roadway segment exceeding the threshold.

5. The computer-implemented method of claim 4, wherein determining the roadway segment travel time for each roadway segment of the plurality of roadway segments includes
   identifying, by the processor, the local roadway segment and the remote roadway segment based on the threshold, the roadway segment travel time including one or more of a local roadway segment travel time and a remote roadway segment travel time, the local roadway segment travel time being based on a real-time travel time through the local roadway segment, and the remote roadway segment travel time being based on a historical travel time through the remote roadway segment.

6. The computer-implemented method of claim 5, wherein calculating the total travel time includes determining average roadway segment travel times for a roadway segment in each route in the set of routes based on the local roadway segment travel time and the remote roadway segment travel time of roadway segments in the route.

7. The computer-implemented method of claim 1, wherein the plurality of roadway junctions include at least a freeway onramp.

8. The computer-implemented method of claim 1, wherein providing the route guidance for the particular route to the client device based on the route guidance data includes recalculating travel times for the particular route based on a second location of the client device during transit of the particular route by the client device.

9. The computer-implemented method of claim 1, comprising calibrating, by the processor, the threshold using a deviation among local roadway junction travel times, remote roadway junction travel times, and measured travel times.

10. The computer-implemented method of claim 1, wherein determining the route guidance data for the particular route includes selecting, by the processor, the particular route from the set of routes based on the total travel time and a stored user preference for particular route attributes.

11. A system comprising:
a processor;
a non-transitory storage device; and
a navigation application executable to:
   identify a first location of a client device and a destination location, the first location of the client device being determined using a positioning system sensor coupled with the client device;
   determine a plurality of roadway segments and a plurality of roadway junctions based on the first location of the client device, the destination location, and map data, the plurality of roadway junctions including one or more local roadway junctions below a threshold and one or more remote roadway junctions above the threshold;
   calculate a roadway segment travel time for each roadway segment of the plurality of roadway segments;
   receiving real-time traffic data for the one or more local roadway junctions from one or more data servers;
   receiving historical traffic data for the one or more remote roadway junctions;
   calculate a local impact of traffic on a local roadway junction travel time for each of the one or more local roadway junctions using the real-time traffic data and a remote impact of traffic on a remote roadway junction travel time for each of the one or more remote roadway junctions using the historical traffic data;
   determine a set of routes between the first location of the client device and the destination location using the map data, the roadway segment travel times for the plurality of roadway segments, the local roadway junction travel times of the one or more local roadway junctions, and the remote roadway junction travel times of the one or more remote roadway junctions;
   calculate a total travel time for each route in the set of routes based on the roadway segment travel times, the local roadway junction travel times, and the remote roadway junction travel times;
   determine route guidance data for a particular route selected from the set of routes; and
   provide route guidance for the particular route to the client device based on the route guidance data.

12. The system of claim 11, wherein calculating the local impact of traffic on the local roadway junction travel time includes
   receiving local roadway junction information of a given local roadway junction including a real-time delay at the given local roadway junction, the given local roadway junction including one or more of a traffic signal, intersection, freeway onramp, and freeway off-ramp, and
   calculating the local impact of traffic based on the real-time delay.

13. The system of claim 11, wherein calculating the remote impact of traffic on the remote roadway junction travel time includes
   receiving remote roadway junction information of a given remote roadway junction including a historical time delay at the given remote roadway junction, the given remote roadway junction including one or more of a traffic signal, intersection, freeway onramp, and freeway off-ramp, and
   calculating the remote impact of traffic based on the historical time delay.

14. The system of claim 11, wherein the plurality of roadway segments include a local roadway segment within the threshold and a remote roadway segment exceeding the threshold.

15. The system of claim 14, wherein determining the roadway segment travel time for each roadway segment of the plurality of roadway segments includes identifying the local roadway segment and the remote roadway segment based on the threshold, the roadway segment travel time including one or more of a local roadway segment travel time and a remote roadway segment travel time, the local roadway segment travel time being based on a real-time travel time through the local roadway segment, and the remote roadway segment travel time being based on a historical travel time through the remote roadway segment.

16. The system of claim 15, wherein calculating the total travel time includes determining average roadway segment travel times for a roadway segment in each route in the set of routes based on the local roadway segment travel time and the remote roadway segment travel time of roadway segments in the route.

17. The system of claim 11, wherein the plurality of roadway junctions include at least a freeway onramp.

18. The system of claim 11, wherein providing the route guidance for the particular route to the client device based on the route guidance data includes recalculating travel times for the particular route based on a second location of the client device during transit of the particular route by the client device.

19. The system of claim 11, comprising calibrating the threshold using a deviation among local roadway junction travel times, remote roadway junction travel times, and measured travel times.

20. The system of claim 11, wherein determining the route guidance data for the particular route includes selecting the particular route from the set of routes based on the total travel time and a stored user preference for particular route attributes.

* * * * *